United States Patent [19]
Stone

[11] 3,717,977
[45] Feb. 27, 1973

[54] SMOKE POLLUTANT CONCENTRATOR

[75] Inventor: Charles W. Stone, New Philadelphia, Ohio

[73] Assignees: William J. Freeman; Reese Taylor, Akron, Ohio ; part interest to each

[22] Filed: April 5, 1971

[21] Appl. No.: 131,032

Related U.S. Application Data

[63] Continuation-in-part of Ser. No. 731,906, May 24, 1968, abandoned, which is a continuation-in-part of Ser. No. 501,678, Oct. 22, 1965, abandoned.

[52] U.S. Cl. .................55/110, 55/123, 55/128, 55/136, 55/139, 55/155
[51] Int. Cl. ................................B03c 3/04
[58] Field of Search........55/101, 123, 128, 129, 130, 55/136, 137, 138, 139, 140, 143, 145, 146, 155, 154, 110

[56] References Cited

UNITED STATES PATENTS 2,978,066  4/1961  Nodolf.................55/155 X

FOREIGN PATENTS OR APPLICATIONS 699,670  11/1953  Great Britain.................55/128

Primary Examiner—Dennis E. Talbert, Jr.
Attorney—J. William Freeman et al.

[57] ABSTRACT

An improved type of air pollution control device wherein micro-particles of a size incapable of normally being picked up by a conventional electrostatic precipitator are agglomerated by the use of an unbalanced and intermittent electrostatic field which agglomerates them to sufficient size to facilitate removal. In addition to agglomerating particles the attracting electrodes are arranged in a uniquely spaced arrangement of zones so that a progressive cleaning action occurs during movement of the gaseous medium through the unit to thus, in effect, achieve self-cleaning without the need for shutdown which would otherwise be required.

2 Claims, 5 Drawing Figures

PATENTED FEB 27 1973

INVENTOR.
CHARLES W. STONE
BY Freeman & Taylor

ATTORNEY

INVENTOR.
CHARLES W. STONE
BY Freeman & Taylor
ATTORNEY 3,717,977

SMOKE POLLUTANT CONCENTRATOR

RELATED APPLICATION

This application is a continuation-in-part of applicant's pending application, Ser. No. 731,906 for "Air Pollution Control Means" filed May 24, 1968 now abandoned, which application was a continuation-in-part of applicant's still earlier filed application identified as Ser. No. 501,678 filed Oct. 22, 1965, now abandoned.

In the earlier filed application above referred to, Applicant disclosed the use of a grouping of a bare electrode and an electrode encased in a dielectric coating to create an unbalanced electrostatic field so as to cause agglomeration on an encapsulated electrode. While this principle is used in each of the several stages of this application, the further improvement that exists herein is that the spacing is controlled and arranged in such a fashion that the advancing particles are subject to increasingly strong periodically interrupted or intermittently applied electrostatic fields so as to be drawn progressively through the unit and ultimately discharged in an operation that may be deemed self-cleaning.

BACKGROUND OF THE INVENTION

This invention generally relates to air pollution control and involves an electrical device designed to concentrate foreign material which may be carried in a gaseous medium such as smoke.

PRIOR ART

In addition to the above referred to copending application of the applicant, attention is also directed to Strubler U.S. Pat. Nos. 3,110,580 and 3,257,779. The Strubler U.S. Pat. No. 3,110,580 uses alternately arranged electrodes that are inserted within dielectric tunnels so as to theoretically cause particle attraction to occur by gravity upon subjecting of the electrodes to the influence of alternating current. The Strubler U.S. Pat. No. 3,257,779, while embodying the same basic concept, sets forth a particularly shaped electrode of a distinct stellate cross sectional profile.

In both Strubler patents the electrode was always arranged so as to be encircled by a dielectric material such as a ceramic wall. In this fashion during the period that the electrode of Strubler was in a negative condition the particles would be repelled towards the ceramic wall surface while an attraction of such particles would exist in the electrode during the period that the same was in positive condition. In practice, it has been found that the operation of the Strubler device was predicated upon an extremely sensitive humidity condition to avoid arcing.

SUMMARY OF THE INVENTION

Applicant initially improved over the prior art by, in effect, inserting the electrode within the dielectric wall portions of Strubler and connecting the same to the alternating current system supplied. The net effect of this arrangement was to create an encapsulated electrode that created an unbalanced condition in the electrostatic field with the encapsulated electrode being incapable of emitting a strong charge because of the dielectric component that surrounds the same.

As a result of this condition it follows that an electronic unbalance was created that resulted in the electrons being attracted to the surface of the dielectric material because of the inability of the same to repel the electrons with equal force and effect. In this regard, an analogy may be drawn between a normal wall surface and one covered with a sticky substance representing the surface of the encapsulated electrode while the regular wall surface would be analogous to the bare electrode employed in the applicant's concept. Using ping pong balls as an example of electrons, it is obvious that there would be a difference in repelling force of the two surfaces and this is the situation that applicant has created in his first application so as to, in effect, create an unbalance.

Such an arrangement creates the ability of the unit to agglomerate particles on the dielectric surface which greatly facilitates the cleaning of the unit with agglomeration being necessary in order to create particles of proper size that can be removed by conventional cleaning filters.

While the above has constituted a marked advance over the prior art, applicant has further discovered that the need for cleaning at all can be eliminated by arranging the electrodes in a particular fashion. Specifically, each of the bare electrodes is preferably formed with a flared out frontal portion that serves as a funnel type of diverting device for particles being moved off of an upstream encapsulated electrode with the progressive distance between the outboard bare electrodes being decreased so that ultimately the advancing agglomerants may be collected by a vacuum tube or other means at the end of the unit and automatically removed therefrom. Further, the electrostatic field is preferably applied intermittently by pulsing or interrupting the current supply at a rate dependent upon the velocity of flow of the gaseous medium through the device.

In this regard, while this principle has been found to be operable on units using the same electric current to all of the electrodes, it is obvious that assistance in this regard could be given by progressively increasing the intensity of electrostatic field so as to cause a greater attraction to be encountered progressively through the unit in the direction of flow with this assisting in the transfer of agglomerants from one encapsulated electrode to the next aforesaid downstream dielectrode.

Production of an improved air pollution control means having the above characteristics accordingly becomes the principal object of this invention with other objects thereof becoming more apparent upon a reading of the following brief specification, considered and interpreted in the light of the accompanying drawings.

Figure 1:
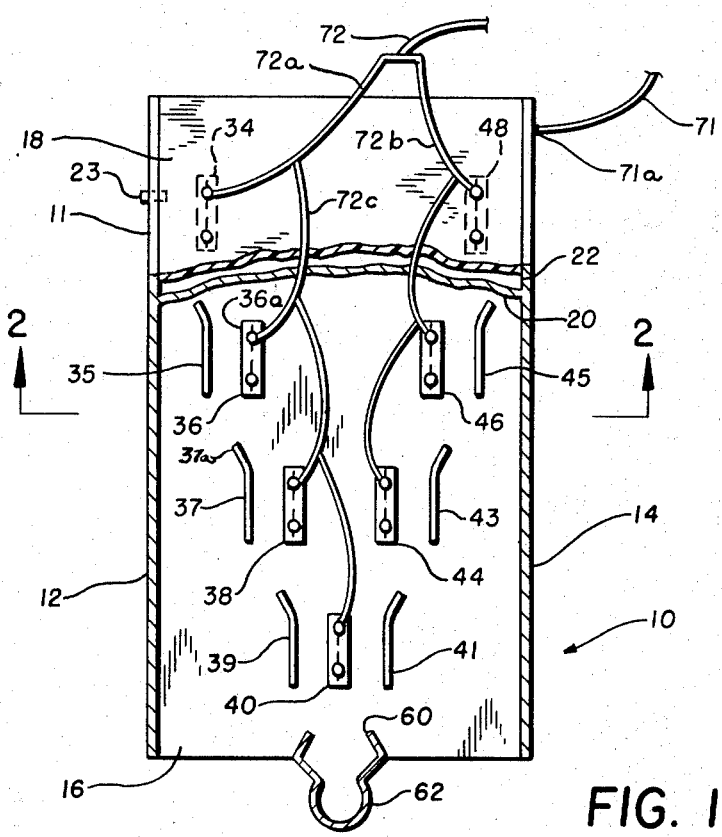
FIG. 1 is a top view with a portion of the top enclosures broken away to permit greater facility in illustration.

Turning now to the drawings and particularly to FIG. 1, the smoke control unit of this invention will be seen indicated generally by the numeral 10. The unit 10 includes a casing 11 comprised of spaced side walls 12 and 14, bottom wall 16 and top enclosure 18 defined by a metallic plate 20 and a dielectric plate 22. If desired, and as shown, the longitudinal ends of unit 10 may be left open allowing a free flow of the gaseous medium through the now defined passageway 24. However, as will be understood, perforated or grated plates in shiftable relationship to each other may be employed. Such a embodiment would permit some control over the amount of gaseous medium introduced into the unit 10 which may, at times, be advantageous.

Figure 3:
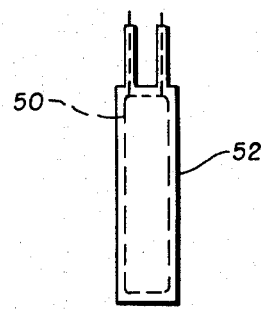
FIG. 3 is a side plan view of the encapsulated or enrobed electrode of this invention.

In the passageway 24 are spaced a plurality of electrodes. As illustrated, these include bar electrodes 35, 37, 39, 41, 43 and 45 and encapsulated or enrobed electrodes 34, 36, 38, 40, 44, 46 and 48. The enrobed electrodes, as best seen in FIG. 3, have their current carrying material 50 imbedded in a dielectric or nonconductive substance 52, for purposes which will become evident. The substance 52 should have the properties of low porosity, high electrical rupture strength, and moderate resistivity. The resistivity should be of an order of magnitude allowing a small milliampere flow density over a given surface area. For example, at an applied voltage of 15,000 to 20,000 volts, a resistance permitting a current flow of 1 to 5 milliamperes per square inch has been found satisfactory. Dielectric substances 52 may include quartz, silica glass, borosilicate glass such as Pyrex, the compound Vycor (Trademark of Corning Glass Company) and other similar materials. Also to be noticed are the relationship somewhat in pairs or pollutant removal stations, between the bare electrodes and the enrobed electrodes as, for instance, between electrodes 37 and 38 and between electrodes 43 and 44. The various pairs generally transversely arranged, as for example stations 37-38 and 43-44, form pollutant removal zones.

When the unit 10 is energized, in a manner which will hereinafter be described, the whole of passageway 24 becomes an electrical field, but due to the kind and arrangement of the electrodes employed, deliberate "inequalities" occur in the electrical field with the electrical strength being greater near the bare electrodes and less near the enrobed electrodes. In effect, electrical currents are activated within the electrical field of unit 10 since it is known that electricity will naturally flow from a point of saturation to a point of deficiency. Consequently, in the unit 10, the deficiencies will occur in the area of the enrobed electrodes causing the direction of flow to be to the enrobed electrode from its transversely related bare electrode.

Therefore, the gaseous medium which is introduced into the unit 10 must flow through an electrical field. As a result, many of the particles, minute or microscopic as they may be, in the composition of the gaseous medium become ionized or charged. Having been so ionized, the particles become subject to the aforementioned currents within the electrical field of the unit 10. As a result, the particles will be directed to and gather on, near, or adjacent to each of the several enrobed electrodes as the gaseous medium passes through the unit 10, thereby assuring reentry of the gaseous medium into the atmosphere in a much cleaner condition.

Further, it will be seen that the relationship between the bare and enrobed electrodes is not limited only to transverse direction but exists also in the longitudinal direction. For instance, as seen in FIG. 1, electrode 37 is paired with electrode 38 in transverse direction but has an extending, bent portion or flange 37a cooperating with the outside edge 36a of the electrode 36 in the longitudinal direction.

It has been observed that it is desirable for the particles gathered adjacent the enrobed electrodes to "travel" or "crawl" with the direction of flow of the gaseous medium. Thus, when the particles, for instance, leave the influence of electrode 36, they are more or less "scooped" by the flange 37a of electrode 37 which assures their becoming subject to the current between the electrodes 37 and 38. In view of this, it should be readily understandable that the gathering of the particles which start with the pollutant removal zone defined by electrodes 34 and 48 is controlled and directed in longitudinal movement to effect a virtual concentration of the foreign material that is carried by the gaseous medium for ultimate explusion of the same through exit slot 60. In this regard, a vacuum tube 62 or any other suitable expedient may be used to withdraw the extracted particles from the unit 10.

In energizing the unit 10, high voltage electricity is used with one means for accomplishing this purpose being the use of a transformer to increase the voltage of commercially available electricity. Other means of producing high voltage electricity, including rectified direct current, will, of course, be readily apparent to those skilled in the art. The high voltage is also preferably interrupted or pulsed so as to avoid electrostatic field effects which create back pressure in the device 10. For example, a pulsing rate of 6 to 8 pulses per second of a voltage of 15,000 to 20,000 volts should be used for a device 10 conveying a flow of 8 cubic feet per second. In any event, when wiring the unit 10 to receive high voltage electricity, the ground wire 71 will be led for attachment to the casing 11 as shown at 71a. The output wire 72 is led for connection to one or more of the enrobed electrodes as by wires 72a, 72b, 72c, and so on, as is suitable or desired in a particular installation.

The bare electrodes extend between and are rigidly secured to the bottom wall 16 and the top plate 20 of the casing 11. Consequently, charging the casing 11 as described, results in each of the bare electrodes receiving identical and equal charges. The enrobed electrodes extend through apertures in the plates 20 and 22 and are secured in position by means of dielectric fasteners 21, 21. To prevent accumulation of particles on the electrodes in the space 25 between the plates 20 and 22 which might cause a short circuit, nozzle 23 is provided to permit air circulation in this space.

In use or operation of the improved unit, it will be first assumed that the air with pollutant in it enters the upper end of the unit as shown in FIG. 1 and will travel downwardly. The air which passes between the pollutant removal station defined by the bare electrode 35 and the enrobed electrode 36 will deposit micro-particles on the face 36a of the electrode 36 due to the unbalance created. Pairs of electrodes, such as electrodes 35 and 36 should be spaced apart at a distance dependent upon the voltage used. For example, at 15,000 to 20,000 volts, the spacing should be one-half to five-eighths inches. A similar buildup, of course, occurs on electrode 46. As the microparticles agglomerate in size, they will be more and more influenced by the force of flow in the air and thus will creep down towards the lower end of the unit 36 so as to then be ultimately removed therefrom whereupon they will be collected by the end 37a of the electrode 37 co as to be subject to the electrical field that exists between the pollutant removal station of the electrodes 37 and 38. A similar progression will occur at the next pollutant removal station between electrodes 39 and 40 with final collection being in unit 60 as has been earlier indicated. It will be noted that in each instance the width between the flared ends of the outboard electrodes such as 37 and 43 is greater than the width between the upstream encapsulated electrodes 36 and 46, for example, so that at all times, there is a funneling effect of the ever increasing number of agglomerants so that the unit in effect will be progressively cleaned by virtue of the fact that these agglomerants automatically are progressing through the unit.

At the same time, the air passing between electrodes 36 and 46 will remain "dirty" but a portion of the air stream will be cleaned by electrodes 37, 38, 43, 44 and the remainder by electrodes 39, 40, 41 so that the entire stream will have been subject to cleaning by the time it reaches exit slot 60.

It should be noted here that while three groupings of electrodes have been illustrated, the invention is not intended to be so limited and the number may be varied depending upon the size of the installation.

Figure 2:
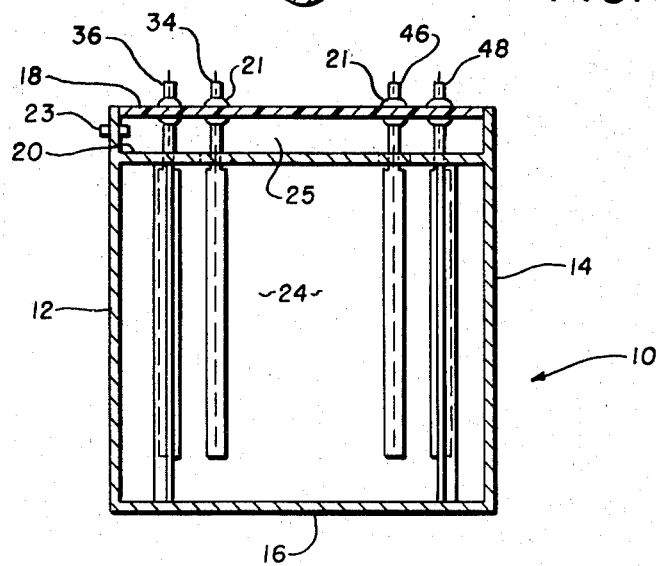
FIG. 2 is a sectional view taken on the line 2—2 of FIG. 1.

The modified form of the invention shown in FIGS. 4 and 5 of the drawings is similar to that previously illustrated in connection with FIGS. 1 through 3, but differs in that insulation is provided with respect to the metal case so as to improve the overall characteristics of the unit. Interruption means are further disclosed to cause intermittent interruption to the current for purposes to be described.

Figure 4:
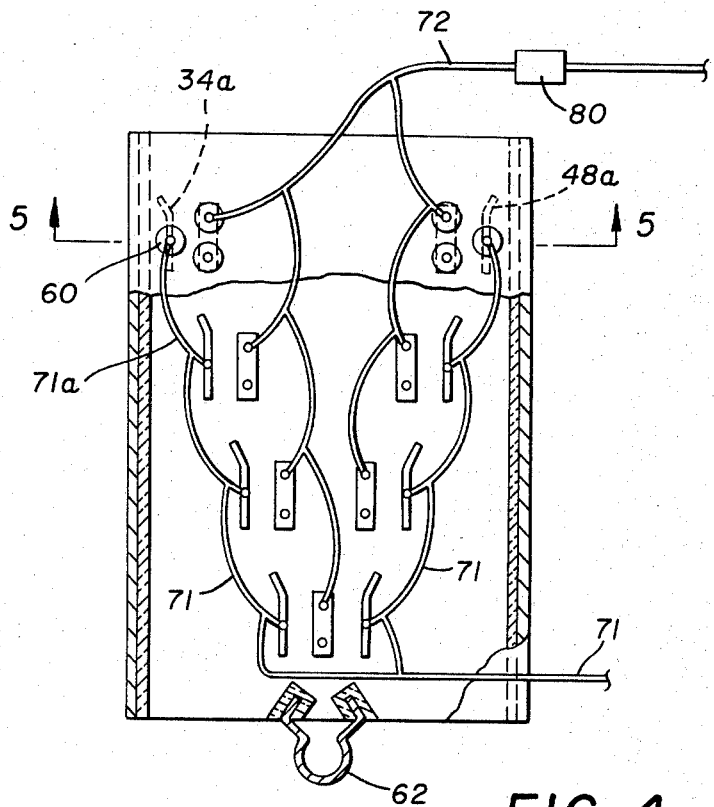
FIG. 4 is a top plan view partially broken away and in section of a modified form of the invention.
Figure 5:
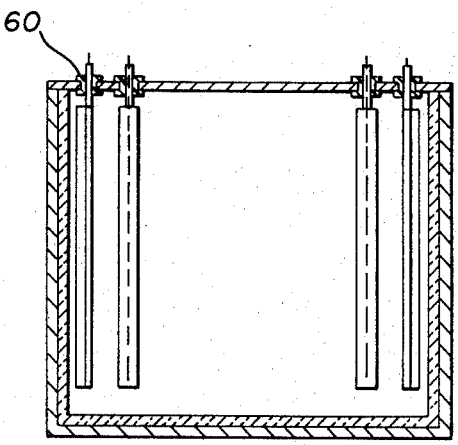
FIG. 5 is a sectional view taken on the line 5—5 of FIG. 4.

Referring now to FIG. 4 of the drawings, all of the bare electrodes and enrobed or encapsulated electrodes are similar in nature to the ones earlier shown in FIG. 1, for example, with the exception that in FIG. 4, two additional bare electrodes 34a and 48a are added to form the mouth opening adjacent the input end. Additionally, the various electrodes 34a, 35a, 37, 39, 41, 43, 45 and 48a are suspended with respect to the bend of the unit, as will be noted in FIG. 5 of the drawings, with each of the units being insulated with respect to the metal by identical collars 60, 60 as clearly shown in FIG. 5.

By this arrangement, a harness consisting of branches 71a, 71a join together to form a separate outlet wire 71 that replaces the outlet wire 71 shown earlier in FIG. 1 of the drawings. An interruptor is inserted across one line 71 or 72 (installed in line 72 in the modification shown in FIG. 4) so as to interrupt the current. It is felt that this current interruption is important in that it causes a periodic deposition of particles on the electrode surfaces, with the interruption serving to assist the "crawling" nature of these particles toward the ultimate collection point indicated by the numeral 62 in FIG. 4.

It should also be noted that either direct or alternating current can be used to operate the device.

While a full and complete disclosure of the invention has been set forth in accordance with the dictates of the Patent Statutes, it is to be understood that modifications may be resorted to without departing from the spirit hereof or the scope of the appended claims.

What is claimed is:

1. An electrical pollutant concentrator of the character described comprising;
   A. a housing having a through passageway that interconnects an input end and an output end;
   B. first means for forcing air into said input end through said passage, and out of said output end;
   C. a series of pollutant removal zones disposed transversely of said passage in the path of air flowing through said passage;
   D. each pollutant removal zone including two pollutant removal stations;
   E. each pollutant removal station including a bare electrode and a encapsulated electrode;
   F. the transversely spacing between the electrodes of each pollutant removing station being substantially identical and being relatively small in comparison to the overall transverse width of said passageway;
   G. second means for creating an electrical field unbalance between said electrodes of each said station whereby said pollutants will be agglomerated on one such electrode at each such station;
   H. the transverse spacing between stations decreasing in each zone;
   I. third means for concentrating the pollutants so agglomerated adjacent said output end whereby said electrical pollutant concentrator is substantially self-cleaning.

2. The concentrator of claim 1 further characterized by the fact that said second means include a selectively interrupted electrostatic field.

* * * * *